United States Patent [19]

Schmidt et al.

[11] 4,263,250
[45] Apr. 21, 1981

[54] LUBRICANT AND RELEASE AGENT FOR MOLDED RUBBER ARTICLES

[75] Inventors: Günter Schmidt; Hans-Ferdi Fink, both of Essen, Fed. Rep. of Germany

[73] Assignee: Th. Goldschmidt AG, Essen, Fed. Rep. of Germany

[21] Appl. No.: 78,768

[22] Filed: Sep. 25, 1979

[30] Foreign Application Priority Data

Oct. 16, 1978 [GB] United Kingdom ............... 40689/78

[51] Int. Cl.$^3$ .............................................. B28B 7/36
[52] U.S. Cl. ................................ 264/338; 106/38.22; 427/135
[58] Field of Search ........... 106/38.22, 287.14, 287.16; 252/52 A; 264/338; 427/135

[56] References Cited

U.S. PATENT DOCUMENTS

| | | | |
|---|---|---|---|
| 2,425,755 | 8/1947 | Roberts et al. | 252/52 A |
| 3,337,351 | 8/1967 | Moorehouse | 106/287.14 |
| 3,871,837 | 3/1975 | Bedague et al. | 252/52 A |

*Primary Examiner*—Lorenzo B. Hayes
*Attorney, Agent, or Firm*—Toren, McGeady and Stanger

[57] ABSTRACT

A composition which possesses both good lubrication and release properties for use in the manufacture of molded rubber articles composed of a mixture of (a) monoalkyl ethers of oxyethylene-oxypropylene copolymers, in which the weight ratio of oxyethylene groups to oxypropylene groups is 25 to 75:75 to 25; and (b) polyoxyalkylene-polysiloxane copolymers in which the components (a) are soluble or dispersible.

3 Claims, No Drawings

LUBRICANT AND RELEASE AGENT FOR MOLDED RUBBER ARTICLES

BACKGROUND OF THE INVENTION

1. Field of the Invention

This invention pertains to the field of release agents for molded rubber articles and particularly to the use of polysiloxane copolymers therefor.

2. Description of the Prior Art

In the manufacture of molded rubber articles, a release agent is required in order to be able to take the molded rubber goods from the molds and to prevent adhesion of the molded articles to the walls of the mold. Frequently, however, such a release agent is also required to reduce the friction between the molded rubber articles and the wall of a form-giving element.

Particularly difficult lubrication and release problems occur in the manufacture of so-called elbow hoses, such as those required in building automobiles and for washing machines and dry cleaning machines. In these procedures, a vulcanizable blank is pulled onto a plug which, at times, has a very complicated shape. After the vulcanization, the hot molded rubber article must be pulled from the plug. This is an operation which requires the use of considerable force. The force required is determined on the one hand by the shape of the plug and, on the other hand, by the adhesion of the molded article to the plug.

In order to avoid adhesion and to improve the ability to slide, such blanks, which are to be pulled onto a bent plug and vulcanized, have been treated with dispersions of silicone oils, glycerin and waxes. Admittedly, adhesion and friction are reduced by such means. However, it is desirable to further improve the sliding properties of such a lubricant and release agent. At the same time, it is particularly important that the lubricant and release agents can be removed without leaving a residue, so as not to impair the use of the elbow hoses. Preferably, it should be possible to remove the lubricants and release agents with cold water.

SUMMARY OF THE INVENTION

We have discovered that these requirements can be fulfilled by the use of a mixture of (a) monoalkyl ethers of oxyethylene-oxypropylene copolymers in which the weight ratio of oxyethylene groups to oxypropylene groups is 25 to 75:75 to 25; and (b) polyoxyalkylene-polysiloxane copolymers in which the components (a) are soluble or dispersible;

in a weight ratio of (a):(b)=99:1 to 25:75 as lubricants and release agents in the manufacture of molded rubber articles, especially elbow hoses.

DESCRIPTION OF THE PREFERRED EMBODIMENTS

The monoalkyl ethers of oxyethylene-oxypropylene copolymers are liquid to pasty products and, as a rule, constitute the major component of the mixture. They are manufactured by adding ethylene oxide and propylene oxide, either as a mixture or blockwise, consecutively, to a starting alcohol be a conventional reaction. Preferably, the alcohol contains 1 6 carbon atoms, and n-butanol is most preferred.

Polyols, such as, glycol, prpopylene glycol or glycerin, are also suitable as starting alcohols. The monoalkyl ethers of the oxyethylene-oxypropylene copolymers have an average molecular weight of 1,200 to 10,000.

As the polyoxyalkylene-polysiloxane copolymers, the well-known block copolymers which are also used on a large scale as stabilizers in the foaming of polyurethanes may be used. They should, however, be soluble or dispersible in the aforementioned monoalkyl ethers of the oxyethylene-oxypropylene copolymers, in order to make it possible to prepare a stable preparation. The compatibility of the two types of compounds (a) and (b) can be improved by the addition of slight amounts of water.

The method of preparation and composition of such polyoxyalkylene-polysiloxane copolymers are disclosed in German Patent No. 17 95 557. At the same time, it is immaterial whether the polyoxyalkylene block is connected to the polysiloxane block by an SiC or an SiOC bond.

Neither the monoalkyl ether of the oxyethylene-oxypropylene copolymers nor the polyoxyalkylene-polysiloxane copolymers by themselves are usable as lubricants and release agents for the inventive purpose. Surprisingly, however, the addition of one part by weight of polyoxyalkylene-polysiloxane copolymer to 99 parts by weight of oxyethylene-oxypropylene copolymers is sufficient to produce a mixture whose properties are far superior to those products presently known in the state of the art. The product used in accordance with the invention has excellent release properties and increases the ability of vulcanized molded rubber articles to slide, for example, on bent plugs, so that it is possible to pull the elbow hoses after the vulcanization much more easily and with a lesser expenditure of force from the plugs.

In the following, typical formulations are given for mixtures which are to be used in accordance with the invention.

EXAMPLE 1

Lubricants and release agents are prepared by mixing a monobutyl ether of an oxyethylene-oxypropylene copolymer with a molecular weight of 1,770 and a polyoxypropylene content of 59.0 weight percent with a polyoxyalkylene-polysiloxane copolymer, which has a cloud point of 327°–331° K. (54°–58° C.), a viscosity of 1,200 mPas at 298° K. (25° C.) and a density of 1.05 g/cm$^3$ at 298° K. (25° C.), in the mixing ratios listed in Table 1.

The resulting lubricants and release agents were evaluated by the following method:

In order to measure the release forces, the mixtures of the monobutyl ether of the oxyethylene-oxypropylene copolymers and the polyoxyalkylene-polysiloxane copolymer were applied on a cylindrical plug of stainless steel with a diameter of 30 mm and a length of 150 mm in such a manner that about 0.1 g of the release agent combination was distributed uniformly on 100 cm$^2$ of surface. The plug is then enveloped by a 10 cm wide, 6 mm thick band of a rubber mixture, which has not been vulcanized and which fully encloses the circumference of the plug. In order to ensure satisfactory molding, two half shells of stainless steel are now placed around the rubber band and connected tightly with one another. The half shells are so constructed that, in the following vulcanization which is associated with an expansion, no rubber can emerge from the sealing and embedding joints between mold and plug. The device, so charged, is then transferred to a vulcanizing kettle in which the rubber mixture is vulcanized at the appropriate temperature and for the appropriate time.

In this example, an acrylonitrile/butadiene rubber mixture was used with a tensile strength (DIn 53 504) of 10.6 N per mm² and a Shore hardness (DIN 53 505) of 67 shore A. The vulcanizing time was 20 minutes at 423° K. (150° C.). When the vulcanization was completed, the device was removed from the vulcanizing kettle and cooled to 323° K. (50° C.). Subsequently, the force was measured which, when acting tangentially on the molded article, is required in order to displace the molded article relative to the plug. An initial force is measured, which is required in order to initiate the displacement. This force is referred to in the table as release value. A second force is also measured. This is the force which is required in order to continue the displacement and is described in the table as the sliding value. A good release agent should have a low release value and an even lower sliding value. In practice, especially for the manufacture of so-called long hoses, those release agents with a release value of <10 and a sliding value of <2 have proven to be trouble free in use.

Table 1 shows that pure monobutyl ethers of oxyethylene-oxypropylene copolymers do not produce adequate release and sliding values. Admittedly, the pure polyoxyalkylene-polysiloxane copolymer produces good release values. However, the lubricating effect, expressed by the sliding value is not adequate whereas the inventive mixtures provide good release values as well as good sliding values.

lene-oxypropylene copolymer with a molecular weight of 1,900 and a polyoxypropylene content of 25.3 weight percent with 5 parts by weight of a polyoxyalkylene-polysiloxane copolymer, which has a cloud point of 323° K. (50° C.), a viscosity of 950 mPas at 298° K. (25° C.) and a density of 1.04 g/cm³ at 298° K. (25° C.). The mixture was tested by the method described in Example 1.

A release value of 6.6 and a sliding value of 1.4 were obtained.

What is claimed is:

1. In a method for manufacturing molded rubber articles wherein a release agent is applied to a mold, the rubber composition is applied to the mold and then subjected to vulcanization conditions, the improvement which comprises said release agent being a mixture of
    (a) monoalkyl ethers of oxyethylene-oxypropylene copolymers in which the weight ratio of oxyethylene groups to oxypropylene groups is 25 to 75:75 to 25, wherein the monoalkyl ethers are formed from the addition of ethylene oxide and propylene oxides to a lower alcohol containing from 1 to 6 carbon atoms, and
    (b) polyoxyalkylene-polysiloxane copolymers in which the components (a) are soluble or dispersible.

2. The method of claim 1 wherein the alcohol is selected from the group consisting of n-butanol, glycol, propylene glycol and glycerin.

3. The method of claim 1 wherein the monoalkyl

TABLE 1

|  | Release Agent and Lubricant No. | Parts by Weight Monobutyl Ether of the Oxyethylene-oxypropylene copolymer | Parts by Weight Polyoxyalkylene-polysiloxane Copolymer | Release Forces | |
| --- | --- | --- | --- | --- | --- |
|  |  |  |  | Release Value | Sliding Value |
| Comparison, | 1 | 100 | 0 | >18 | 6.3 |
| not of the | 2 | 10 | 90 | 2.9 | 2.5 |
| Invention | 3 | 0 | 100 | 3.5 | 2.7 |
| In accordance | 4 | 99 | 1 | 9.1 | 1.6 |
| with the | 5 | 95 | 5 | 8.2 | 1.2 |
| Invention | 6 | 80 | 20 | 2.4 | 1.2 |
|  | 7 | 40 | 60 | 2.1 | 1.2 |
|  | 8 | 25 | 75 | 2.4 | 1.3 |

EXAMPLE 2

A lubricant and release agent was prepared by mixing 95 parts by weight of a monobutyl ether of the oxyethyethers of the oxyethylene-oxypropylene copolymers have a molecular weight in the range from about 1,200 to 10,000.

* * * * *